Feb. 19, 1957

W. T. M. JOHNSON 2,782,131

METHYL METHACRYLATE LACQUER COATED
METAL ARTICLE AND PROCESS THEREFOR
Filed June 4, 1954

FIG. 1

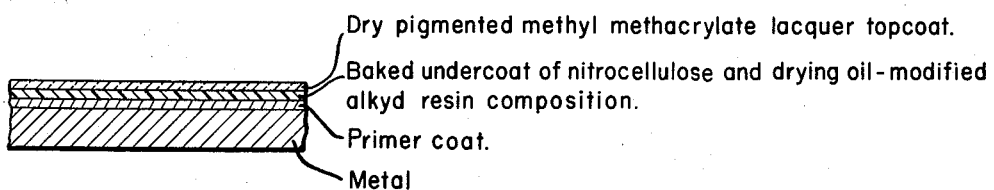

Dry pigmented methyl methacrylate lacquer topcoat.
Baked undercoat of nitrocellulose and drying oil-modified alkyd resin composition.
Primer coat.
Metal

FIG. 2

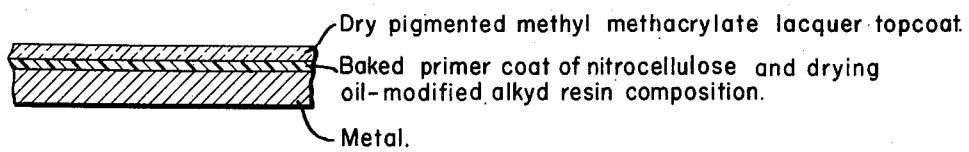

Dry pigmented methyl methacrylate lacquer topcoat.
Baked primer coat of nitrocellulose and drying oil-modified alkyd resin composition.
Metal.

INVENTOR
WILLIAM T. M. JOHNSON

BY  *Ernest N. Beck*

ATTORNEY

United States Patent Office 2,782,131
Patented Feb. 19, 1957

2,782,131

METHYL METHACRYLATE LACQUER COATED METAL ARTICLE AND PROCESS THEREFOR

William T. M. Johnson, Philadelphia, Pa., assignor to E. I. du Pont de Nemours and Company, Wilmington, Del., a corporation of Delaware Application June 4, 1954, Serial No. 434,663

13 Claims. (Cl. 117—74)

This invention relates to multiple layer finishing systems for metal, and more particularly to such systems comprising a pigmented alkyd resin-nitrocellulose type of primer and a pigmented methyl methacrylate lacquer top layer directly over the primer.

The term "polymer of methyl methacrylate" and related terms, as used herein, mean homopolymers of methyl methacrylate, copolymers of methyl methacrylate and other materials copolymerizable therewith containing a major proportion of methyl methacrylate, or mixtures of such homopolymers and/or copolymers.

The terms "methyl methacrylate lacquer," "methyl methacrylate coating composition," and related terms as used herein for the sake of brevity, mean liquid coating compositions containing conventional pigments and solvents and, as the principal film-forming material, a polymer of methyl methacrylate. The methyl methacrylate lacquers may also contain conventional modifiers, such as plasticizers, inhibitors, dispersing agents, flow control agents and the like. When reference is made to a layer, or film of methyl methacrylate lacquer the term signifies a dry layer obtained by applying one or more coatings of such liquid compositions to a suitable substrate and permitting or causing the coating to dry.

The term "primer," as used herein, means a liquid coating composition which is applied to the metal article being coated, or a dry layer thereof derived from one or more applications of the liquid composition.

The term "topcoat," as used herein, means the last liquid coating composition which is applied to the metal article being coated, or a dry layer thereof derived from one or more applications of the liquid composition.

The term "finishing system," as used herein, means a multiple-layer coating of at least two different coating compositions comprising a primer and a top layer in adherent contact therewith.

It is known that polymers of methyl methacrylate have excellent outdoor durability. In particular, pigmented lacquers containing methyl methacrylate polymers as the principal film-forming material have excellent gloss retention, i. e., the original high gloss is retained during long periods of outdoor exposure. However, such compositions do not inherently possess the high level of metal-protecting and rust-inhibiting properties required for painting metal which is to be used outdoors, e. g., steel automobile bodies. Therefore, in order to take advantage of the excellent durability of methyl methacrylate lacquers, the metal to be finished must first be primed with a metal-protecting and rust-inhibiting primer. One or more coats of methyl methacrylate lacquer are applied thereover to provide a durable decorative top layer.

It has been found that the conventional metal primers, which are commonly used under alkyd resin enamel, amino-aldehyde resin enamel or nitrocellulose lacquer topcoats, are not suitable for use under methyl methacrylate lacquer topcoats. More specifically, the durability advantages of methyl methacrylate lacquer top layers cannot be fully realized with these primers because of metal-to-primer or primer-to-top layer relations which cause a failure in the finishing system before the top layer alone has failed to the same stage of non-serviceability. In particular, finishing systems comprising a methyl methacrylate lacquer top layer over a conventional prior art metal primer are characterized by one or more of the following important deficiencies: Poor adhesion of the primer to metal, poor adhesion of the topcoat to the primer, and cracking of (development of fissures in) the top layer and/or the multiple-layer finishing system.

The broad object of this invention is to provide an improved multiple-layer metal finishing system comprising a primer and a top layer.

A specific object of this invention is to provide a multiple-layer metal finishing system comprising a top layer of a methyl methacrylate lacquer and, directly thereunder, a layer of a metal protective primer, the characteristics of the primer, the metal-to-primer relationships, and the primer-to-top layer relationships being such that full advantage can be taken of the excellent outdoor durability of methyl methacrylate lacquers.

A more specific object of this invention is to provide a multiple-layer metal finishing system comprising a top layer of a methyl methacrylate lacquer and, directly thereunder, a layer of a metal protective primer which differs from prior art primers in that it possesses simultaneously the essential properties of excellent adhesion to metal, excellent adhesion of the top layer to it, and resistance to cracking of the top layer and/or the multiple-layer finishing system.

A further object is to provide metal articles, particularly steel articles, having a hard, adherent, durable and crack-resistant multiple-layer protective coating comprising a methyl methacrylate top layer.

A still further object is to provide metal protective primers having specific properties which are required for use with methyl methacrylate top layers.

These objects are accomplished by providing a multiple-layer finishing system for metal consisting of a layer of primer and a superposed layer of methyl methacrylate lacquer in adherent contact with said primer, said primer being a baked layer of a liquid coating composition comprising pigment, solvent, and organic film-forming material, the later comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of drying glyceride oils and fatty acids derivable therefrom.

Finishing systems of the invention are illustrated by the drawing in which Figure 1 shows an enlarged cross sectional view of a representative portion of a three layer coated metal article of the invention, and Figure 2 shows an enlarged cross sectional view of a representative portion of a two layer coated metal article of the invention.

The coated metal articles of this invention are prepared by applying to the metal article a liquid primer having the above defined composition, baking it to produce a hard adherent layer, applying directly thereover a liquid methyl methacrylate lacquer, and drying the latter.

The critical characteristics of the primer apparently reside in its organic film-forming constituents. Based on the weight of the total organic film-forming material, at least 10% of lacquer-grade nitrocellulose must be used to provide acceptable adhesion of the methyl methacrylate topcoat lacquer to the primer but, if more than 25% is used, the adhesion of the primer to the metal or first coating is deficient. The remainder of the organic film-forming material is predominantly oil modified alkyd resin for hardness, toughness, flexibility, solvent resistance and adhesion to metal. Alkyd resins have a more desirable balance of these properties than other film-forming materials, such as natural gums and resins, oleoresinous varnishes, ester gums, and phenolic resins, although small proportions of members of this group may be used. The alkyd resin contains, as a chemically combined modifier therein, one or more glyceride oils having drying properties or the fatty acids derivable therefrom, which provide harder, more adherent and more solvent-resistant alkyd resins for this purpose than do the non-drying oils or their related fatty acids. The amount of oil or fatty acid modifier in the alkyd resin is between 35% and 70% by weight. Below 35%, flexibility and adhesion to metal are deficient. Above 70%, hardness and solvent resistance are deficient.

With the above and other objects in view, which will be apparent as the description proceeds, I have set forth my invention in the following specification, and have included several specific examples by way of illustration, but not by way of limitation. Unless otherwise specified, the parts and percentages are given by weight.

EXAMPLE 1

A primer having the requirements of the primers of this invention was prepared as follows:

First portion: Parts by wt.
43% soya oil modified glycerol phthalate alkyd resin, 55% solution in hydrocarbon solvents_ 2.6
Titanium dioxide_____ 2.4
Barytes _____ 9.5
Zinc oxide_____ 3.4
Black filler_____ 6.1
Whiting _____ 7.0
Soya lecithin dispersant, 50% solution in hydrocarbon solvents _____ 0.3
Hydrocarbon solvents _____ 8.8

Second portion:
Lacquer solvents _____ 22.5
⅛" lacquer-grade nitrocellulose, 40% solution in lacquer solvents _____ 9.4
40% linseed oil modified glycerol phthalate alkyd resin, 50% solution in hydrocarbon solvents _____ 8.6
24% linseed oil, 24% China-wood oil modified glycerol phthalate alkyd resin, 50% solution in hydrocarbon solvents _____ 17.0
Butylated urea-formaldehyde resin, 60% solution in butanol _____ 1.3
Dibutyl phthalate _____ 1.1
                                         ———
                                         100.0

The composition was prepared by grinding the ingredients of the first portion in conventional paint grinding equipment until a smooth uniform dispersion was obtained. Then the ingredients of the second portion were admixed therewith to produce a liquid coating composition.

In this composition, the organic film-forming material consisted of 18.9% of lacquer-grade nitrocellulose, 71.6% of drying oil modified alkyd resin, 3.9% of urea-formaldehyde resin, and 5.6% of dibutyl phthalate.

EXAMPLE 2

A primer having the requirements of the primers of this invention and having the following composition was prepared as in Example 1:

First portion: Parts by wt.
43% soya oil modified glycerol phthalate alkyd resin, 55% solution in hydrocarbon solvents_ 4.8
Titanium dioxide _____ 4.5
Barytes _____ 17.9
Zinc oxide _____ 6.5
Black filler_____ 11.6
Whiting _____ 13.3
Soya lecithin dispersant, 50% solution in hydrocarbon solvents _____ 0.6
Hydrocarbon solvents _____ 16.6

Second portion:
Lacquer solvents _____ 5.1
⅛" lacquer-grade nitrocellulose, 40% solution in lacquer solvents _____ 3.9
24% linseed oil, 24% China-wood oil modified glycerol phthalate alkyd resin, 50% solution in hydrocarbon solvents _____ 14.0
Butylated urea-formaldehyde resin 60% solution in butanol _____ 0.6
Dibutyl phthalate _____ 0.6
                                         ———
                                         100.0

In this composition, the organic film-forming material consisted of 12.8% of lacquer-grade nitrocellulose, 79.2% of drying oil modified alkyd resin, 3% of urea-formaldehyde resin, and 5% of dibutyl phthalate.

EXAMPLE 3

A primer having the requirements of the primers of this invention and having the following composition was prepared as in Example 1:

First portion: Parts by weight
43% soya oil modified glycerol phthalate alkyd resin, 55% solution in hydrocarbon solvents__ .8
Red iron oxide _____ 4.4
Barytes _____ 7.1
Whiting _____ 5.7
Micronized talc _____ 1.2
Zinc chromate _____ 1.5
Soya lecithin dispersant, 50% solution in hydrocarbon solvents _____ 0.2
Guaiacol inhibitor, 10% solution in hydrocarbon solvents _____ 0.5
Hydrocarbon solvents _____ 9.9

Second portion:
Lacquer solvents _____ 16.1
⅛" lacquer-grade nitrocellulose, 30% solution in lacquer solvents _____ 16.1
35% soya oil modified glycerol phthalate alkyd resin, 50% solution in hydrocarbon solvents _____ 29.8
Dibutyl phthalate _____ 2.4
Xylol _____ 4.3
                                         ———
                                         100.0

In this composition, the organic film-forming material consisted of 21.4% of lacquer-grade nitrocellulose, 68% of drying oil modified alkyd resin, and 10.6% of dibutyl phthalate.

*Prior art compositions A–E*

To compare primers (Examples 1–3) having the improved properties claimed in this invention with prior art primers, the five following commercially available, commonly used, and widely accepted prior art primers for steel products, such as automobile bodies, fenders and hoods, were prepared from different combinations of organic film-forming materials. Their organic film-forming constituents, on a non-volatile solids basis, were as follows:

Composition A: Parts by weight
55% linseed oil modified glycerol phthalate resin _____ 59.3
50% linseed oil modified phenol-formaldehyde resin varnish _____ 40.7
                                         ———
                                         100.0

Composition B:
    Lacquer-grade nitrocellulose _____ 38.3
    35% linseed oil modified glycerol phthalate
        resin _____ 38.6
    Dibutyl phthalate _____ 18.5
    Castor oil _____ 4.6
                                                 _____
                                                 100.0

Composition C:
    65% linseed oil modified ester gum varnish__ 92.8
    Bodied linseed oil _____ 7.2
                                                 _____
                                                 100.0

Composition D:
    43% soya oil modified glycerol phthalate resin__ 11.2
    35% soya oil modified glycerol phthalate
        resin _____ 68.4
    Butylated urea-formaldehyde resin _____ 20.4
                                                 _____
                                                 100.0

Composition E:
    43% soya oil modified glycerol phthalate
        resin _____ 100.0

The primers described in Examples 1–3 and Prior art compositions A–E were thinned to a suitable spraying viscosity and each composition was applied to duplicate 4" x 12" autobody steel panels, which had previously been treated with a "Bonderite" rust inhibitor, in sufficient amount to produce a smooth uniform dry coating about 1 mil thick. Due to their different drying characteristics, the wet coated panels were baked at different temperatures for different lengths of time as follows, to produce the proper degree of cure or hardness:

Primer:                         Baking conditions
    Example 1 _____ 30 minutes at 250° F.
    Example 2 _____ 30 minutes at 250° F.
    Example 3 _____ 30 minutes at 300° F.
    Composition A _____ 60 minutes at 200° F.
    Composition B _____ 20 minutes at 180° F.
    Composition C _____ 25 minutes at 370° F.
    Composition D _____ 45 minutes at 275° F.
    Composition E _____ 30 minutes at 180° F.

The primed panels were cooled to room temperature and were subsequently sprayed with a top layer of a typical methyl methacrylate lacquer, which had been thinned to a suitable spraying viscosity, in sufficient amount to yield a smooth, uniform, dry coating about 2 mils thick. The wet topcoated panels were baked for 20 minutes at 180° F. to speed up the drying and produce dry, hard coatings. This would have required 16–24 hours at room temperature. The methyl methacrylate lacquer had the following composition:

Parts by weight
Homopolymer of methyl methacrylate _____ 29.74
Dibutyl phthalate _____ 11.93
Titanium dioxde _____ 7.16
Carbon black _____ 0.07
Ferric yellow _____ 0.98
Red iron oxide _____ 0.12
Toluol _____ 25.00
Xylol _____ 25.00
                                            _____
                                            100.00

The homopolymer of methyl methacrylate employed in this composition had a relative viscosity of about 1.142. This value is the value of the fraction $$\frac{(A) \quad \text{Efflux time of polymer solution}}{(B) \quad \text{Efflux time of solvent used in polymer solution}}$$

The efflux times were measured in accordance with the procedure of A. S. T. M. D–445–46T Method B, using as the "oil" mentioned in said procedure, (A) a solution of 0.25 gram of the methyl methacrylate polymer in 50 cc. of ethylene dichloride, and (B) a sample of the ethylene dichloride used in making said solution, respectively. The determinations were run at 25° C. in a modified Ostwald viscosimeter, series 50.

The methyl methacrylate lacquer was prepared by grinding the pigment in the presence of the polymer until a smooth uniform dispersion was obtained.

The thus coated panels had acceptable properties with respect to appearance, gloss and hardness; and no differences were readily apparent between those coated with a prior art primer and those having a finishing system of this invention.

One set of these panels was tested for the critical property of durability, i. e., resistance to cracking, by exposing them outdoors in Florida for 8 months, with periodic examinations, and rating them for the length of time required for cracking to develop and/or the severity of cracking.

The other set of panels was tested for the critical properties of adhesion of the primer to the panel and adhesion of the top layer to the primer by cutting two 2" marks in the form of an X vertically through the coating down to the metal, securely pressing a strip of pressure-sensitive cellophane adhesive tape over the X, and pulling it off with a jerk, whereby varying amounts of the finishing system were removed. In this test, all of the primers adhered well to the panel, although it is known, from previous tests, that the prior art primer of composition B progressively loses its adhesion to metal during outdoor exposure.

The ratings of the eight finishing systems tested are given in the following table, with 1 being the worst and 8 being the best. The total rating for the two critical properties in which the finishing systems differed from each other is given in the right-hand column, where the highest total indicates the best finishing system.

TABLE 1

| Primer Identification | Adhesion of Top Layer to Primer | Resistance to Cracking | Total Rating |
|---|---|---|---|
| Primers of this Invention: | | | |
| Example 1 | 8 | 7 | 15 |
| Example 2 | 8 | 5 | 13 |
| Example 3 | 8 | 6 | 14 |
| Prior Art Primers: | | | |
| Composition A | 2 | 8 | 10 |
| Composition B | 8 | 1 | 9 |
| Composition C | 1 | 8 | 9 |
| Composition D | 3 | 4 | 7 |
| Composition E | 2 | 5 | 7 |

The above results show that the finishing systems of this invention are markedly superior to analogous finishing systems comprising prior art primers.

The particular alkyd resins employed in Examples 1–3 are merely illustrative of a wide variety of alkyd resins which may be used in the primers of this invention.

Other suitable alkyd resins include the resinous reaction products of (1) a polybasic acid or an anhydride thereof, such as phthalic acid and its isomers, with or without small proportions of other polybasic acids, such as maleic, fumaric, adipic, and the like, (2) a polyhydric alcohol, such as glycerol, pentaerythritol, sorbitol and the glycols, and (3) 35–70%, by weight of the finished resin, of a modifier selected from the group consisting of glyceride oils having drying properties, such as linseed, soya, dehydrated castor, China-wood, perilla, and oiticica oil, and fatty acids derivable therefrom. Such alkyd resins may be substituted for all or part of the alkyd resins employed in Examples 1–3 to provide primers and finishing systems having equivalent advantages over the prior art.

The preferred alkyd resins are modified with 40–55% of glyceride oil having drying properties or the corresponding acids, based on the weight of the finished resin.

The nitrocellulose employed in Examples 1–3 is merely illustrative of a wide variety of lacquer-grade nitrocellulose which may be used. Other suitable grades are those having a viscosity rating of ⅛" to 1", with or without small proportions of grades having viscosity ratings as high as 50" or 100". ⅛" nitrocellulose has a viscosity of about 20 centipoises, and 100" nitrocellulose has a viscosity of about 38,000 centipoises, when measured as a 12.2% solution described in A. S. T. M. Method D–301–33, Formula A. Such grades of nitrocellulose or mixtures thereof may be substituted for all or part of the nitrocellulose employed in Examples 1–3 to provide primers and finishing systems having equivalent properties.

The preferred grade of nitrocellulose is ⅛"–½", having a viscosity of 20–150 centipoises.

The proportions of individual organic film-forming materials employed in the primers of this invention may be varied as follows, based on the total weight of film-forming material: 10–25% of nitrocellulose, 60–90% of drying oil modified alkyd resin, 0–7% of aminoaldehyde resin, and 0–12% of plasticizer. Proportions within these ranges may be substituted for the proportions used in Examples 1–3 with equivalent results.

The preferred proportions are 15–20% of nitrocellulose, 68–80% of alkyd resin, 0–5% of amino-aldehyde resin, and 2–8% of plasticizer.

Suitable amino-aldehyde resins are, for instance, alcohol modified urea-aldehyde resins such as butylated urea-formaldehyde resins, and alcohol modified triazine-aldehyde resins such as butylated melamine-formaldehyde resins.

Suitable plasticizers are, for instance, dibutyl phthalate, benzyl butyl phthalate, 2-ethyl hexyl benzyl phthalate, dicyclohexyl phthalate, di(2-ethyl hexyl) phthalate, the phthalic acid diesters of ethylene glycol monomethyl or monobutyl ether, the adipic or tartaric acid diesters of ethylene glycol monobutyl ether, tricresyl phosphate, triphenyl phosphate, toluene ethyl sulfonamide, butyl phthalyl butyl glycolate, methyl phthalyl ethyl glycolate, glycol sebacate, polyethylene glycol sebacates, and the like.

Although driers, inhibitors, dispersing agents and similar modifiers are not required in the primers of this invention, they may be used in proportions well-known to persons skilled in the organic coating art.

Obviously other pigments and solvents well-known in the organic coating art may be employed.

The primers of this invention are preferably baked for 15–60 minutes at 200–350° F., although it will be obvious that, since baking is merely a means of accelerating the drying process, other drying schedules may be used providing the resulting film of primer is thoroughly dry and hard.

The methyl methacrylate lacquer employed as a top layer in the foregoing description of this invention is merely representative of a wide variety of such lacquers which may be used in the improved finishing systems of this invention. All of the constituents of said lacquer may be varied in kind and/or proportion by means well-known in the art. A suitable homopolymer of methyl methacrylate is specifically disclosed. Suitable copolymers include copolymers of methyl methacrylate with a minor proportion, e. g., 2–25%, of another material copolymerizable therewith, for instance, acrylic and methacrylic acids, the $C_1$–$C_4$ alkyl esters of acrylic acid, the $C_2$–$C_4$ alkyl esters of methacrylic acid, vinyl acetate, acrylonitrile, and styrene. A particularly useful copolymer contains about 98% of methyl methacrylate and 2% of methacrylic acid.

The preferred polymers for use in the methyl methacrylate lacquers have a relative viscosity between 1.117 and 1.196, as measured by the previously defined method, which correspond to calculated molecular weight values of 55,000 to 105,000, respectively, and topcoat lacquers based on such polymers are disclosed and claimed in copending application filed of even date herewith by Laverne W. Crissey and John H. Lowell. Still other topcoat lacquers which are particularly adapted to convenient spray application are disclosed and claimed in copending application Serial No. 402,498, filed January 6, 1954, by Laverne W. Crissey and John H. Lowell.

The preferred finishing systems of this invention consist of the specified type of primer layer, preferably in contact with the metal substrate, and a methyl methacrylate lacquer top layer in contact with the primer. However, it will be obvious from the fact that all of the primers described in this specification, including prior art primers, adhered well to metal that a prior art primer may be used as the first layer on the metal, followed in sequence by a layer of the type required in this invention and a top layer of a methyl methacrylate lacquer. The important requirement is that no other layer be placed between the latter two.

The finishing systems of this invention are useful for obtaining the maximum in outdoor durability from methyl methacrylate top layer lacquers on metal articles, which advantage has not been possible through the use of prior art primers. The finishing systems are particularly useful on steel automobile bodies.

It is apparent that many widely different embodiments of this invention can be made without departing from the spirit and scope thereof; and, therefore, it is not intended to be limited except as indicated in the appended claims.

I claim:

1. A metal article having a hard, adherent, crack-resistant, multiple-layer coating comprising a layer of a coating composition and a superposed layer of pigmented methyl methacrylate lacquer in adherent contact therewith, said first-mentioned layer being a baked layer of a liquid coating composition comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

2. A metal article having a hard, adherent, crack-resistant, multiple layer coating comprising a layer of a coating composition and a superposed layer of pigmented methyl methacrylate lacquer in adherent contact therewith, said first-mentioned layer being a baked layer of a liquid coating composition comprising pigment, solvent, and organic film-forming material, the latter comprising 15–20% of lacquer-grade nitrocellulose, 0–5% of amino-aldehyde resin, 2–8% of plasticizer, and 68–80% of alkyd resin, said alkyd resin being modified with 40–55%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

3. A metal article having a hard, adherent, crack-resistant, multiple-layer coating comprising a layer of primer in adherent contact with said metal and a superposed layer of pigmented methyl methacrylate lacquer in adherent contact with said primer, said primer being a baked layer of a liquid coating composition comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

4. A metal article having a hard, adherent, crack-resistant, multiple-layer coating comprising a first layer of a coating composition in adherent contact with said metal, a second layer of a different coating composition in adherent contact with said first layer, and a third layer of a pigmented methyl methacrylate lacquer in adherent contact with said second layer, said second layer being a baked coating of a liquid coating composition comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

5. The product of claim 1, in which the organic film-forming material of the undercoating composition consists of 18.9% of lacquer-grade nitrocellulose, 3.9% of urea-formaldehyde resin, 5.6% of dibutyl phthalate, and 71.6% of drying oil modified alkyd resin.

6. The product of claim 4, in which the alkyd resin is a mixture of linseed oil modified glycerol phthalate resin and soya oil modified glycerol phthalate resin.

7. The product of claim 1, in which the organic film-forming material of the undercoating composition consists of 12.8% of lacquer-grade nitrocellulose, 3% of urea-formaldehyde resin, 5% of dibutyl phthalate, and 79.2% of drying oil modified alkyd resin.

8. The product of claim 7, in which the alkyd resin is a mixture of linseed oil modified glycerol phthalate resin and soya oil modified glycerol phthalate resin.

9. The product of claim 1, in which the organic film-forming material of the undercoating composition consists of 21.4% of lacquer-grade nitrocellulose, 10.6% of dibutyl phthalate, and 68% of drying oil modified alkyd resin.

10. The product of claim 9, in which the alkyd resin is soya oil modified glycerol phthalate resin.

11. The process of providing metal articles with a hard, adherent, crack-resistant, multiple-layer coating, which comprises applying a layer of a liquid coating composition, baking said coating, applying a superposed layer of pigmented methyl methacrylate lacquer in adherent contact with said first-mentioned layer, and drying said lacquer, said first-mentioned coating composition comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

12. The process of providing metal articles with a hard, adherent, crack-resistant, multiple-layer coating, which comprises applying a layer of liquid primer in adherent contact with said metal, baking said primer, applying a superposed layer of pigmented methyl methacrylate lacquer in adherent contact with said primer, and drying said lacquer, said primer comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

13. The process of providing metal articles with a hard, adherent, crack-resistant, multiple-layer coating, which comprises applying a first layer of a coating composition in adherent contact with said metal, drying said first layer, applying a second layer of a different and liquid coating composition in adherent contact with said first layer, baking said second layer, applying a superposed layer of pigmented methyl methacrylate lacquer in adherent contact with said second layer, and drying said lacquer, said second layer comprising pigment, solvent, and organic film-forming material, the latter comprising 10–25% of lacquer-grade nitrocellulose, 0–7% of amino-aldehyde resin, 0–12% of plasticizer, and 60–90% of alkyd resin, said alkyd resin being modified with 35–70%, by weight of the finished resin, of a member of the group consisting of glyceride oils having drying properties and fatty acids derivable therefrom, and the methyl methacrylate component of said pigmented methyl methacrylate lacquer having a relative viscosity between 1.117 and 1.196.

References Cited in the file of this patent

UNITED STATES PATENTS

| | | |
|---|---|---|
| 2,003,068 | Callahan | May 28, 1935 |
| 2,063,078 | Barrett | Dec. 8, 1936 |
| 2,093,715 | Ellis | Sept. 21, 1937 |